July 29, 1941.  E. J. W. RAGSDALE  2,251,230
SUBWAY RAIL CAR
Filed April 10, 1940
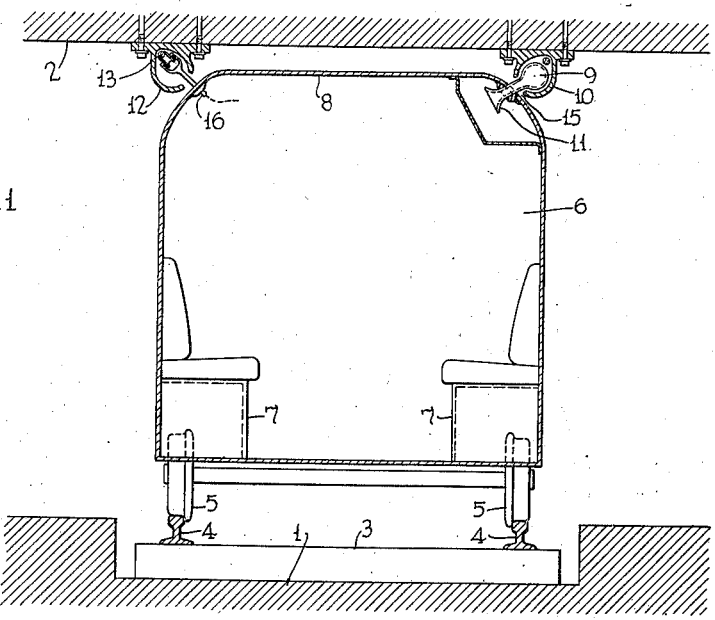
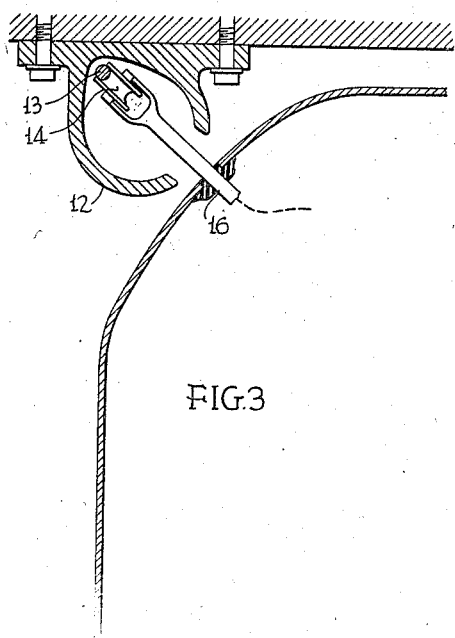
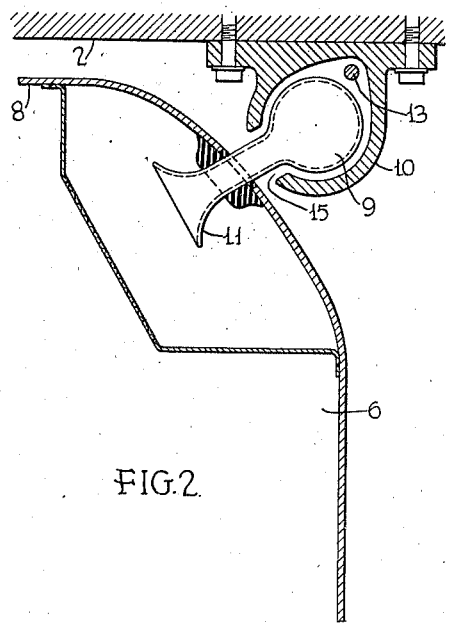
INVENTOR
Earl J. W. Ragsdale
BY John P. Tarbox
ATTORNEY Patented July 29, 1941

2,251,230

UNITED STATES PATENT OFFICE 2,251,230

SUBWAY RAIL CAR

Earl J. W. Ragsdale, Norristown, Pa., assignor to Edward G. Budd Manufacturing Company, Philadelphia, Pa., a corporation of Pennsylvania Application April 10, 1940, Serial No. 328,823

7 Claims. (Cl. 191—35)

The present invention relates to means for ventilating subway cars.

Specifically, it relates to means carried by a vehicle, which operates in a tunnel, subway, or other passage, for scooping air from the same and introducing it into the vehicle.

The invention contemplates providing an air duct traversing one side of the passage in which the vehicle travels, said air duct having an open side adjacent the top of the vehicle, the vehicle carrying a vane or scoop movable within and along said air duct, so that air will be forced into the vehicle when in motion.

A similar duct may be placed at the other side of the tunnel or subway, to house a trolley wire or similar conductor for supplying electrical energy to the vehicle.

Obviously a single duct may serve both purposes, that is, it may serve as an air duct and as a shield for the trolley conductor, and furthermore such dual-purpose duct may be provided at each side of the passage so that either or both may serve both purposes separately or jointly.

The invention is of particular importance where the size of the passage is limited, especially where its height is restricted, so that there is little space available above the top of the vehicle.

For a clear understanding of the invention, a preferred form thereof is disclosed in the present specification, and the drawing accompanying the same and forming a part of the disclosure.

In said drawing:

Fig. 1 is a diagrammatic cross section through a vehicle and tunnel embodying the invention;

Fig. 2 is a sectional detail showing the air duct and cooperating parts on an enlarged scale; and Fig. 3 is a sectional detail showing the duct carrying the trolley conductor, engaged by the trolley wheel.

Similar elements are designated by corresponding reference characters in the several views.

Referring to Fig. 1, there is shown a subway or tunnel having a floor 1 and a top or ceiling 2. Ties 3 on the floor carry the rails 4, upon which run the wheels 5 of the car or other vehicle 6, having the seats 7 therein.

It will be noted that the top 8 of the car travels very close to the ceiling 2 of the subway, as here illustrated. Under such conditions it is difficult to secure proper "natural" ventilation in the car.

The present invention provides such ventilation by means of a scoop or vane 9 carried by the car and running in a duct 10 of curved section, which is mounted in proper position on a side wall of the subway, or under the ceiling thereof.

The duct 10 has a slot or open side 15 directed toward the car, to provide a passage for a pipe 11, attached to the scoop and providing an air conduit opening into the car.

A similar duct 12 may be provided adjacent the other side of the top of the car 6, and may serve to house and support a trolley wire 13 or equivalent conductor, on which bears a trolley shoe or wheel 14, carried by the car 6 and electrically connected to a conductor 16, which may supply electrical power to the motors of the car in the conventional way.

Obviously, a single duct may also serve both functions, that is, it may act as an air duct and also as a housing and support for the electric conductor. Carrying this still further, each duct may have a conductor therein, so as to serve either purpose, in which case a car may be run in either direction on a single track, by reversing it end for end at each terminus, the ducts being always in proper relation to the car, one to act as an air supply and the other as a trolley housing.

The operation of the invention has already been disclosed, in describing the structural features. The scoop 9 is mounted close to the roof of the car and does not project higher than the top of said roof, so that it may be accommodated in the subway. When the car is in motion, the scoop will compress the air in front of it in the duct 10, so that some of said air will enter the pipe 11 and will thus serve to ventilate the car.

The trolley wheel or shoe 14 is also close to the car, and preferably on the side opposite to that on which the scoop is mounted. The duct thus may serve the joint purposes of providing ventilation and protecting the trolley wire.

Obviously, the invention is capable of being embodied in other forms besides the one shown, and therefore the scope thereof is defined solely in the following claims.

I claim:

1. Means for ventilating a track-vehicle, comprising a stationary conduit substantially parallel to the track on which the vehicle runs, and having a continuous slot extending therealong, in combination with an air scoop located within said conduit and substantially filling the inner dimensions of said conduit, and an air pipe carried by the vehicle and passing through the slot, and leading from said scoop to the interior of the vehicle, the slot being of relatively small width as compared with the size of the conduit.

2. Means for ventilating a subway track-vehicle, comprising a conduit located on a wall of the subway and substantially parallel to the track on which the vehicle runs, and having a continuous slot extending therealong, in combination with an air scoop located within said conduit and carried by the vehicle and substantially filling the inner dimensions of said conduit and an air conducting means passing through the slot and leading from said scoop to the interior of the vehicle, the slot being of relatively small width as compared with the size of the conduit.

3. Means for supplying electricity and ventilation to a subway track-vehicle, comprising a stationary conduit substantially parallel to the track on which the vehicle runs, and having a continuous slot, narrow as compared with the size of its conduit, extending therealong, in combination with an air scoop located within said conduit and substantially filling the inner dimensions of said conduit, an air pipe carried by the vehicle and passing through the slot and leading from said scoop to the interior of the vehicle, a trolley conductor in said conduit but out of contact with said scoop, and a trolley shoe carried by the vehicle and bearing against said conductor.

4. Means for supplying electricity and ventilation to a subway track-vehicle, comprising two similar spaced stationary conduits substantially parallel to the track on which the vehicle runs, and each having a continuous slot, narrow as compared with the size of its conduit, extending therealong, in combination with an air scoop located within one of said conduits and substantially filling the inner dimensions thereof, an air pipe carried by the vehicle and passing through the corresponding slot, and leading from said scoop to the interior of the vehicle, a trolley conductor in the other conduit, and a trolley shoe carried by the vehicle and bearing against said conductor.

5. Means for supplying electricity and ventilation to a subway track-vehicle, comprising two similar spaced stationary conduits carried by the wall of the subway and substantially parallel to the track on which the vehicle runs, each conduit having a trolley conductor therein and each having a continuous slot, narrow as compared with the size of the conduit, extending therealong, in combination with an air scoop located within one of said conduits and substantially filling the inner dimensions thereof, an air pipe carried by the vehicle and passing through the slot and leading from said scoop to the interior of the vehicle, and a trolley shoe carried by the vehicle and bearing against the conductor in the other conduit.

6. Means for ventilating and supplying electricity to a subway track-vehicle, said means comprising two similar conduits secured to the wall of the subway and symmetrically located adjacent opposite sides of the top of the vehicle, said conduits extending substantially parallel to the track on which the vehicle runs and each having an open side of narrow width as compared with the size of the conduit and directed toward said vehicle, an air scoop located within one of said conduits and substantially filling the inner dimensions thereof, means comprising an air pipe, connecting said scoop to the interior of the vehicle, a trolley shoe, means supporting said shoe from the vehicle, and a trolley conductor in the other conduit, said shoe bearing on said conductor and supplying electricity to the vehicle.

7. Means for ventilating and supplying electricity to a subway track-vehicle, said means comprising two similar conduits secured to the wall of the subway and symmetrically located adjacent opposite sides of the top of the vehicle, said conduits extending substantially parallel to the track on which the vehicle runs and each having an open side of narrow width as compared with the size of the conduit directed toward said vehicle, each conduit having a trolley conductor therein, an air scoop located within one of said conduits and substantially filling the inner dimensions thereof, means comprising an air pipe, connecting said scoop to the interior of the vehicle, a trolley shoe, and means supporting said shoe from the vehicle, said shoe bearing on the conductor in the other conduit and supplying electricity to the vehicle.

EARL J. W. RAGSDALE.